United States Patent
Chen et al.

[19]

[11] Patent Number: 6,166,655

[45] Date of Patent: Dec. 26, 2000

[54] DEVICE AND METHOD FOR IDENTIFYING MAGNETIC INDUCTION COORDINATE

[76] Inventors: Hung-Chou Chen, No. 5, Fan Po Street, Fu Hsing Hsian, Chang Hua Hsien; Tsang-Yuan Lee, No. 2, Lahne 201, Hsiang Shang Rd., Nan Tou City, Nan Tou Hsien; Ching-I Chen, No. 11, Lane 2, Shu I, Shu I Li, Nan Area, Taichung City, all of Taiwan

[21] Appl. No.: 09/172,132

[22] Filed: Oct. 14, 1998

[51] Int. Cl.⁷ .................................................... G08C 19/06
[52] U.S. Cl. .................................. 340/870.31; 340/870.3; 340/686.1; 340/686.3
[58] Field of Search .............................. 340/686.1, 686.3, 340/441, 444, 448, 466, 671, 672, 870.31, 870.32, 870.33; 324/202, 207.21, 207.24, 207.25, 207.2, 545, 546; 310/68 B, 68 R

[56] References Cited

U.S. PATENT DOCUMENTS

| | | | |
|---|---|---|---|
| 4,642,496 | 2/1987 | K.erviel et al. ........................ | 310/68 B |
| 4,774,464 | 9/1988 | Kubota et al. ........................ | 324/207.25 |
| 4,928,089 | 5/1990 | Gasiunas et al. ................... | 340/870.31 |
| 5,907,244 | 5/1999 | Crabill et al. ............................ | 324/546 |
| 5,929,631 | 7/1999 | Striker et al. ....................... | 324/207.21 |

*Primary Examiner*—Van T. Trieu
*Attorney, Agent, or Firm*—Browdy and Neimark

[57] ABSTRACT

A device and a method for identifying magnetic induction coordinate comprise a movable member which is provided with a magnetic matter and is moved to pass a plurality of sensors arranged in sequence on a fixed member. As the magnetic matter moves through various positions of a moving track, the sensors detect and measure the magnetic flux values at various positions. The data are recorded point by point by an electronic circuit and are then stored in a memory. The magnetic flux values measured by the sensors at any time are compared with the data stored in the memory for identifying the position of the magnetic matter. As the position of the magnetic matter in relation to the fixed member is identified, an output signal of the position is generated.

8 Claims, 8 Drawing Sheets

| X | Sensor a | Sensor b | Sensor c | Sensor d | X | Sensor a | Sensor b | Sensor c | Sensor d | X | Sensor a | Sensor b | Sensor c | Sensor d |
|---|---|---|---|---|---|---|---|---|---|---|---|---|---|---|
| 1 | 44 | -19 | 0 | 2 | 41 | 0 | 10 | -22 | -3 | 81 | -62 | -1 | 0 | 75 |
| 2 | 55 | -25 | 0 | 2 | 42 | 0 | 8 | -13 | -4 | 82 | -73 | -1 | 0 | 66 |
| 3 | 63 | -31 | 0 | 1 | 43 | 0 | 6 | -5 | -4 | 83 | -78 | -1 | 0 | 55 |
| 4 | 76 | -45 | 0 | 1 | 44 | 0 | 5 | 1 | -5 | 84 | -78 | -1 | 0 | 47 |
| 5 | 80 | -57 | 0 | 1 | 45 | 0 | 4 | 9 | -7 | 85 | -74 | -1 | 0 | 39 |
| 6 | 78 | -65 | 0 | 1 | 46 | 0 | 3 | 15 | -8 | 86 | -67 | -2 | 0 | 31 |
| 7 | 70 | -75 | 0 | 1 | 47 | 0 | 2 | 23 | -10 | 87 | -60 | -2 | 0 | 25 |
| 8 | 61 | -79 | 0 | 1 | 48 | 0 | 2 | 30 | -14 | 88 | -50 | -2 | 0 | 20 |
| 9 | 50 | -78 | 0 | 0 | 49 | 0 | 1 | 39 | -17 | 89 | -40 | -2 | 0 | 15 |
| 10 | 43 | -73 | 0 | 0 | 50 | 0 | 1 | 48 | -21 | 90 | -32 | -3 | 0 | 13 |
| 11 | 33 | -66 | 0 | 0 | 51 | 0 | 0 | 55 | -25 | 91 | -23 | -4 | 0 | 10 |
| 12 | 27 | -57 | 0 | 0 | 52 | 0 | 0 | 65 | -32 | 92 | -15 | -4 | 0 | 9 |
| 13 | 23 | -51 | -1 | 0 | 53 | 0 | 0 | 74 | -40 | 93 | -7 | -5 | 0 | 7 |
| 14 | 18 | -39 | -1 | 0 | 54 | 0 | 0 | 77 | -47 | 94 | 0 | -6 | 0 | 6 |
| 15 | 15 | -31 | -2 | 0 | 55 | 0 | 0 | 80 | -57 | 95 | 4 | -7 | 0 | 5 |
| 16 | 12 | -22 | -2 | 0 | 56 | 0 | 0 | 77 | -69 | 96 | 13 | -9 | 0 | 4 |
| 17 | 10 | -14 | -3 | 0 | 57 | 0 | 0 | 67 | -75 | 97 | 20 | -11 | 0 | 4 |
| 18 | 8 | -7 | -4 | 0 | 58 | 0 | 0 | 60 | -79 | 98 | 29 | -14 | 0 | 3 |
| 19 | 6 | 0 | -5 | 0 | 59 | -1 | 0 | 46 | -79 | 99 | 37 | -17 | 0 | 3 |
| 20 | 5 | 5 | -6 | 0 | 60 | -1 | 0 | 38 | -74 | 100 | 44 | -21 | 0 | 2 |
| 21 | 4 | 13 | -8 | 0 | 61 | -1 | 0 | 30 | -67 | | | | | |
| 22 | 4 | 20 | -10 | 0 | 62 | -1 | 0 | 26 | -61 | | | | | |
| 23 | 3 | 27 | -12 | 0 | 63 | -1 | 0 | 19 | -49 | | | | | |
| 24 | 2 | 36 | -15 | 0 | 64 | -2 | 0 | 16 | -40 | | | | | |
| 25 | 2 | 45 | -19 | 0 | 65 | -2 | 0 | 14 | -32 | | | | | |
| 26 | 2 | 53 | -23 | 0 | 66 | -3 | 0 | 11 | -21 | | | | | |
| 27 | 1 | 63 | -30 | 0 | 67 | -3 | 0 | 9 | -15 | | | | | |
| 28 | 1 | 71 | -37 | 0 | 68 | -4 | 0 | 7 | -7 | | | | | |
| 29 | 1 | 76 | -44 | 0 | 69 | -5 | 0 | 6 | 0 | | | | | |
| 30 | 0 | 80 | -55 | 0 | 70 | -6 | 0 | 5 | 8 | | | | | |
| 31 | 0 | 77 | -64 | 0 | 71 | -7 | 0 | 4 | 14 | | | | | |
| 32 | 0 | 70 | -73 | -1 | 72 | -9 | 0 | 3 | 21 | | | | | |
| 33 | 0 | 61 | -78 | -1 | 73 | -12 | 0 | 2 | 29 | | | | | |
| 34 | 0 | 50 | -78 | -1 | 74 | -15 | 0 | 2 | 40 | | | | | |
| 35 | 0 | 40 | -74 | -1 | 75 | -18 | 0 | 1 | 49 | | | | | |
| 36 | 0 | 31 | -65 | -1 | 76 | -22 | 0 | 1 | 55 | | | | | |
| 37 | 0 | 26 | -59 | -2 | 77 | -29 | 0 | 1 | 66 | | | | | |
| 38 | 0 | 21 | -50 | -2 | 78 | -35 | -1 | 1 | 73 | | | | | |
| 39 | 0 | 17 | -40 | -2 | 79 | -42 | -1 | 0 | 77 | | | | | |
| 40 | 0 | 13 | -30 | -3 | 80 | -52 | -1 | 0 | 79 | | | | | |

FIG. 11

DEVICE AND METHOD FOR IDENTIFYING MAGNETIC INDUCTION COORDINATE

FIELD OF THE INVENTION

The present invention relates generally to a device and a method for identifying coordinate of magnetic induction, and more particularly to a coding method for measuring any position by means of the magnetic flux of an inductive magnetic matter. The present invention can be widely applied to a revolving or linear motion measurement.

BACKGROUND OF THE INVENTION

The prior art method for detecting the absolute position of a revolving device, such as a motor, a mechanical rotary shaft, etc., includes the use of a rotary shaft which is provided with a coding device consisting of a set of sensing element for sensing a set of binary identification code corresponding to the position, as shown in FIG. 1. In order to bring about the binary identification code of such absolute position, the prior art method makes use of the optical absolute position coding device and the drum-type absolute position coding device. The binary identification code is brought about by the signals representative of the open (O) and the close (I) actions of the sensor element. The position of the revolving device is known after reading.

As shown in FIG. 2, the prior art optical absolute position coding device is composed of a signal disk 10, an optical hole disk 11, a light-emitting diode 12, a signal receiver 13, and a rotary shaft 14. The signal disk 10 is provided by etching with a plurality of penetration portions 101 and solid portions 102, which are arranged circularly and alternately, as shown in FIG. 3. When the signal disk 10 is shone by the light-emitting diode 12, a portion of light is allowed to pass whereas a portion of light is obstructed, in light of the effects of the penetration portions 101 and the solid portions 102. The light that is allowed to pass is received by the signal receiver 13 for bringing about the binary identification code. After detection, the position of the revolving device is determined.

Such a prior art optical coding device as described above has several shortcomings, which are described hereinafter.

The precision of the coding device is dependent on the precision of the signal disk 10 which must be thus made with precision at a high cost. In other words, the prior art optical coding device is not cost-effective.

In view of the fact that the coding devices of various resolutions are used in the sites of various situations, the signal disks 10 of various specifications with respect to precision must be made, thereby resulting in a substantial increase in the capital expenditure.

The operation of the optical coding device of the prior art is vulnerable to interference caused by the environmental factors, such as grease, humidity, dust, etc.

As shown in FIG. 4, the drum-type magnetic absolute position coding device of the prior art is composed of a magnetic drum 20, a rotary shaft 21, and a sensor 22. The magnetic drum 20 has an outer layer which is coated by ejection with a magnetic material layer 201 which is in turn magnetized with a plurality of magnetic pole loops 202, 203, 204 and 205, which are different in magnetic pole number from one another. Located among the magnetic pole loops 202, 203, 204 and 205 is a neutral area. Each of the magnetic pole loops 202, 203, 204 and 205 is corresponding to the sensor 23 of the sensor element set 22. The position of the revolving device is identified by the output signal of the sensor element set 22.

The above-described drum-type magnetic absolute position coding device of the prior art is defective in design in that the magnetic material layer 201, which is coated by ejection on the outer layer of the magnetic drum 20, must be finished at an extra cost. In addition, the magnetic pole loops and the neutral area must be finished with precision at a high cost.

SUMMARY OF THE INVENTION

It is therefore the primary objective of the present invention to provide a device and a method for identifying the magnetic induction coordinate. The device makes use of the analog signal output and is simple in construction and cost-effective.

It is another objective of the present invention to provide a device and a method for identifying the magnetic induction coordinate. The device and the method are suitable for use in a situation calling for a variety of coding needs. The coding precision state of the present invention can be adjusted by electronic circuits.

In keeping with the principle of the present invention, the foregoing objectives of the present invention are attained by the device and the method for identifying the magnetic induction coordinate, which make use of a movable member having thereon the magnetic material, and a series of sensors arranged sequentially on a fixed member. When the movable member is located at various positions, the magnetic flux of the magnetic material of the movable member is measured by the sensors and recorded in a memory via an electronic circuit as a reference position coordinate. When the magnetic material is once again passed the sensors, the magnetic flux measured by each of the sensors is read and compared with the data stored in the memory, so as to attain the coordinate of the magnetic material at the position. As a result, the absolute position of the movable member is determined. A predetermined signal is outputted along with the movement of the movable member.

The functions and the features of the present invention will be more readily understood upon a thoughtful deliberation of the following detailed description of the present invention with reference to the accompanying drawings.

BRIEF DESCRIPTION OF THE DRAWINGS

FIG. 11 shown a data index of the sample point 100 of the present invention.

DETAILED DESCRIPTION OF THE INVENTION

Figure 1:
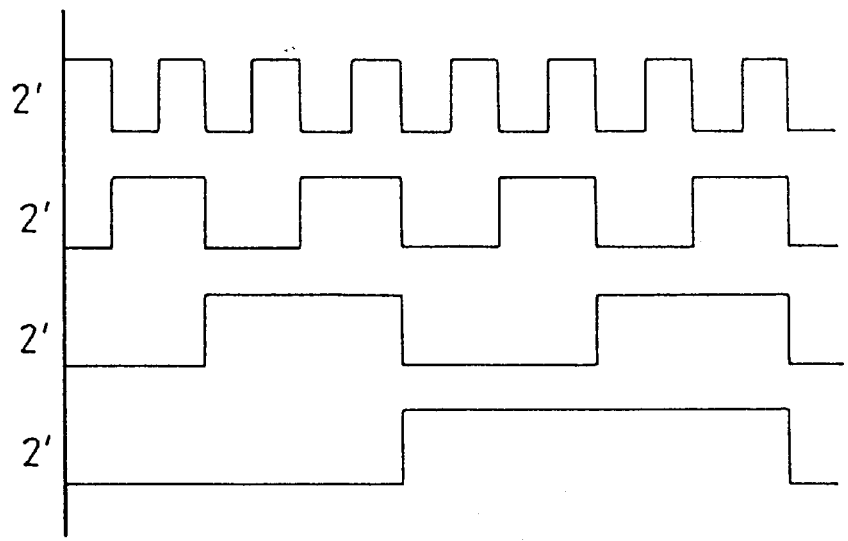
FIG. 1 shows wave form diagrams of binary identification codes outputted by an absolute position coding device of the prior art.
Figure 2:
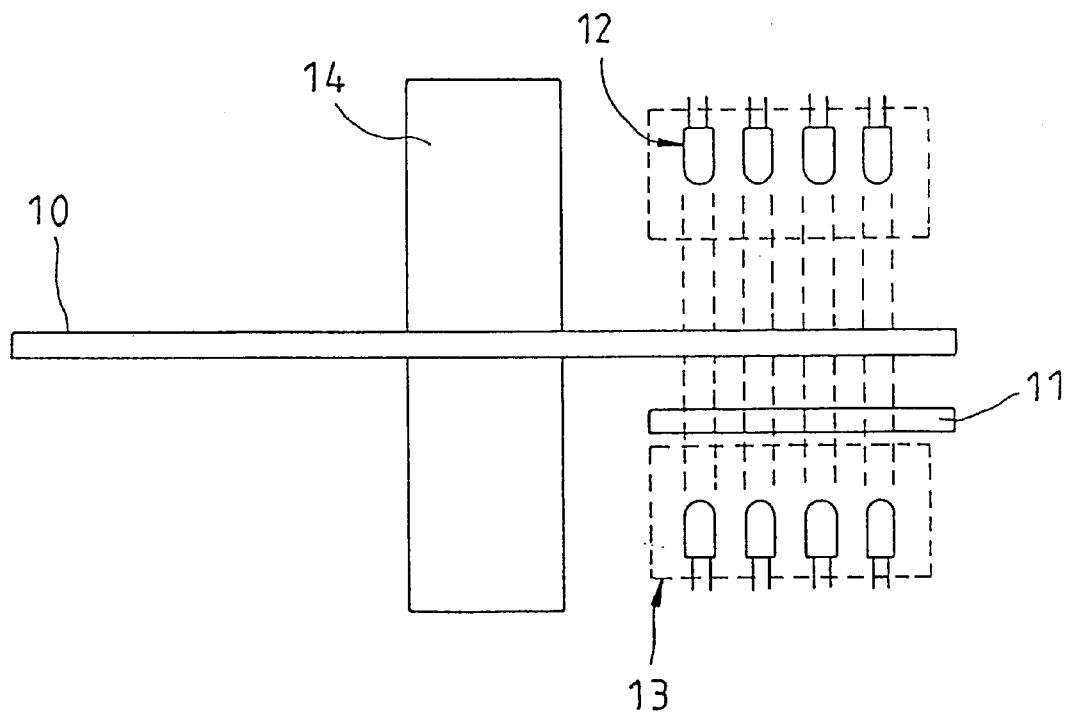
FIG. 2 shows a schematic view of an optical absolute position coding device of the prior art.
Figure 3:
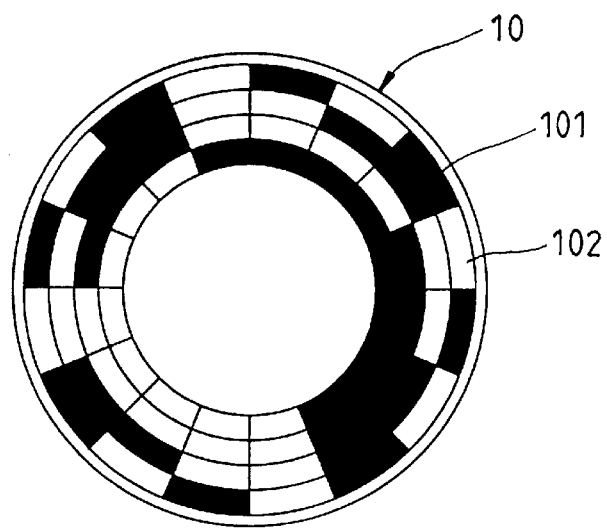
FIG. 3 shows a plan view of a signal disk of the optical absolute position coding device of the prior art as shown in FIG. 2.
Figure 4:
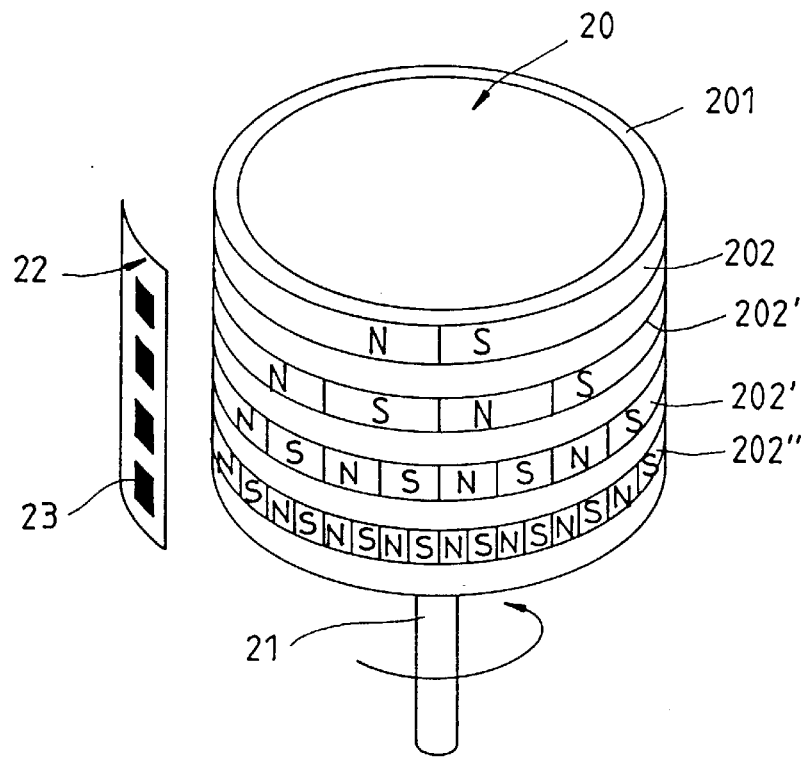
FIG. 4 shows a partial schematic view of a drum-type absolute position coding device of the prior art.
Figure 5:
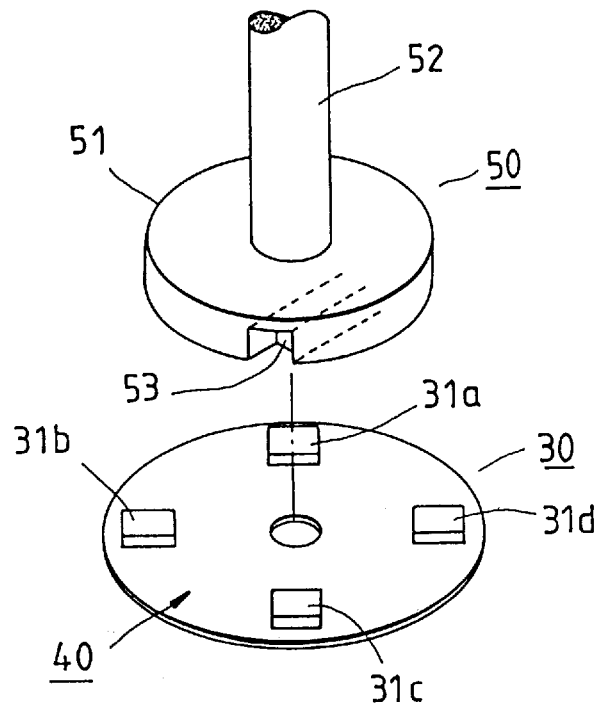
FIG. 5 shows a partial exploded view of a coding device embodied in the present invention.
Figure 6:
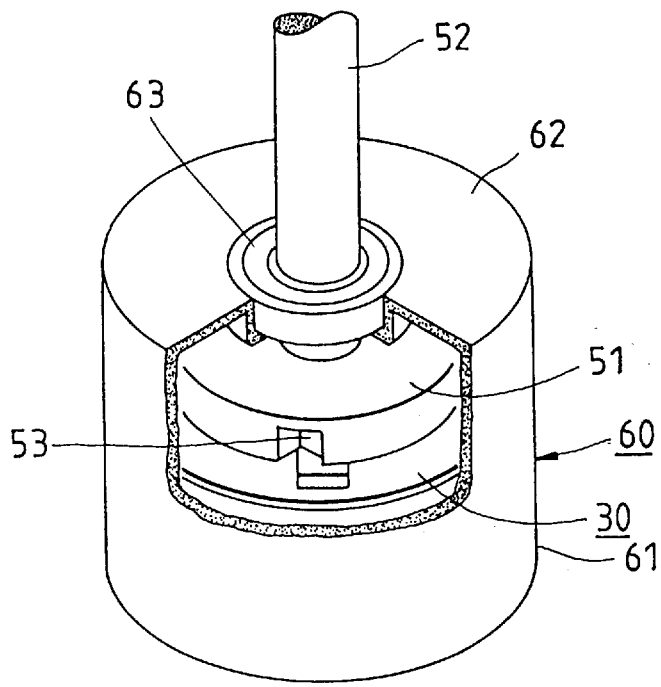
FIG. 6 shows a partial sectional view of the coding device of the present invention in combination with a housing.

As shown in FIGS. 5 and 6, a coordinate identifying device embodied in the present invention is intended to measure the revolving angular position of a revolving shaft. The coding device consists of a fixed member 30, an electronic circuitry 40, a movable member 50, and a housing 60.

The fixed member 30 is mounted securely in the housing 60 and provided with four sensors 31 (31a, 31b, 31c and 31d). These four sensors 31 are sensing elements capable of sensing the magnetic field intensity and converting the magnetic field intensity into a voltage signal. In the embodiment of the present invention, a hall IC or MR Sensor is used as the sensor. The fixed member 30 is preferably a circuit board which is provided with an electronic circuit 40 that is directly connected with the sensors 31.

Figure 9:
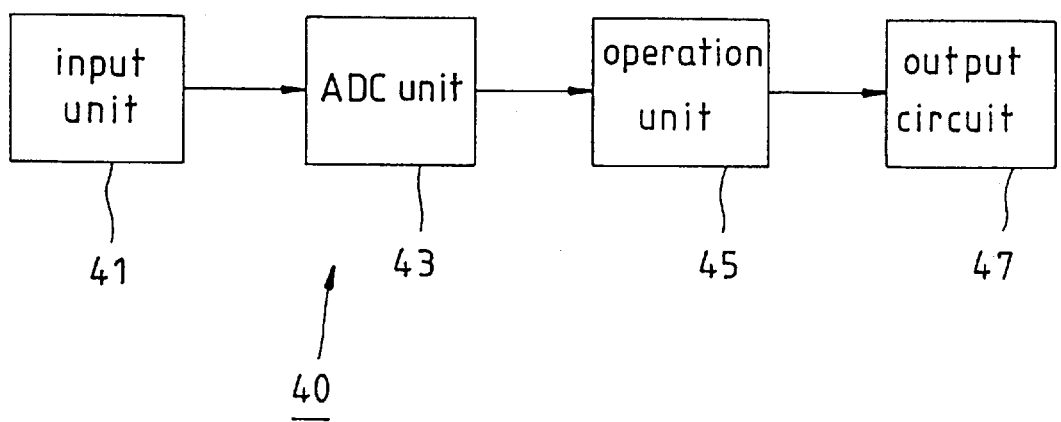
FIG. 9 shows a block diagram of an electronic circuit of the present invention.
Figure 10:
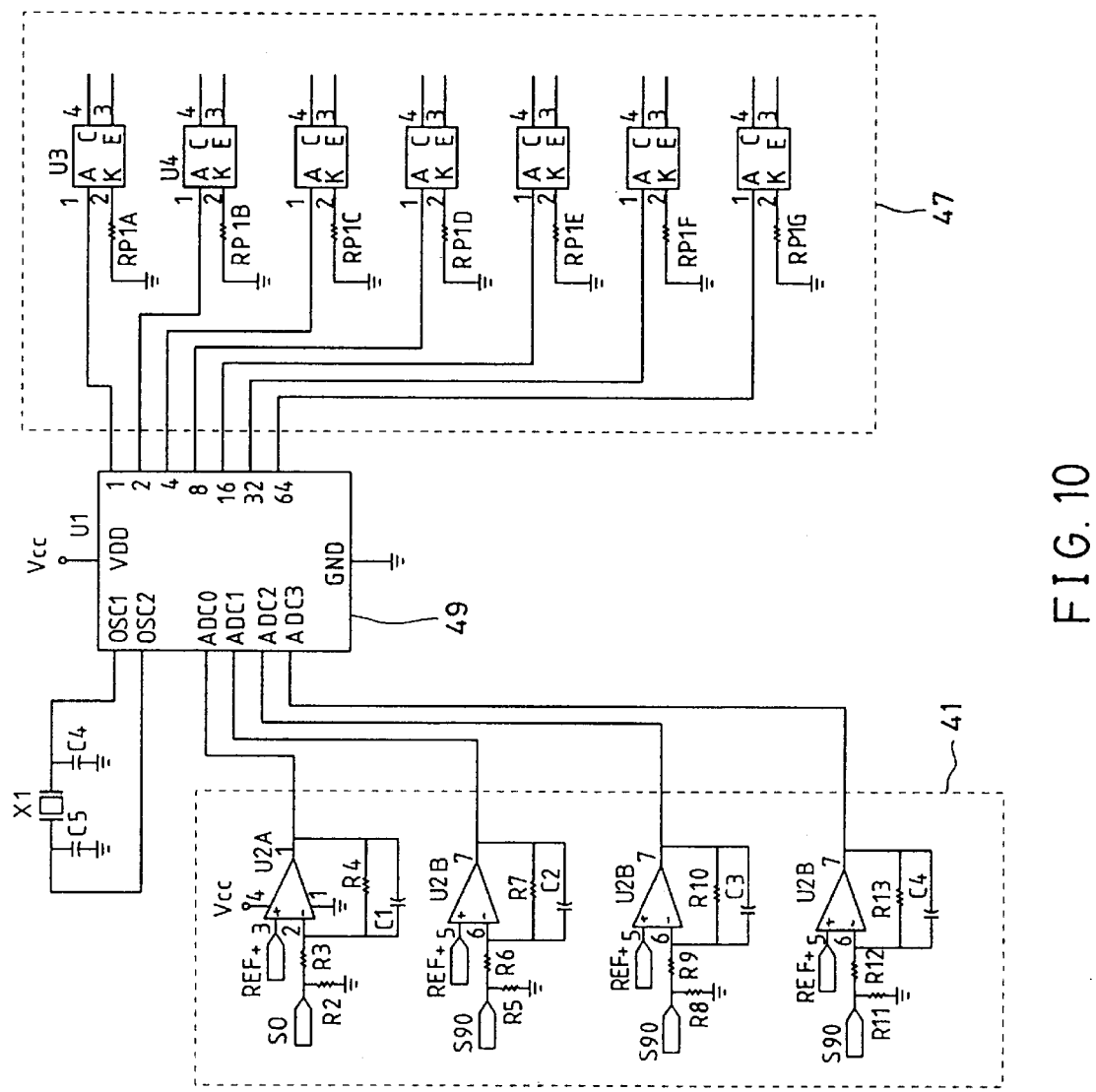
FIG. 10 shows a structural schematic view of the electronic circuit of the present invention.

The electronic circuit 40 is disposed on the fixed member 30 and as shown in FIG. 9 is composed of an input unit 41, an ADC (analog-digital converter) unit 43, an operation unit 45, and an output circuit 47. The detailed construction of the circuit 40 is shown in FIG. 10. The input unit 41 is connected with the sensors 31 for gaining and amplifying the signals measured by the sensors 31 such that the signals are in compliance with the input specifications of the following grade. The ADC unit 43 and the operation unit 45 are incorporated into a processor 49. The ADC unit is intended to convert the analog signals measured by the sensors 31 into the digital signals. The resolution (bit number) of the ADC unit 43 can determine the precision of the converted signals. The operation unit 45 is to operate and judge the signals converted by the ADC unit 43 such that the converted signals are compared with a built-in index coordinate of the system so as to obtain a relative position value. The output circuit 47 is used to output the position value compared by the operation unit 45 such that the position value conforms to the specification of the connection interface signal.

The movable member 50 is mainly composed of a round rotary disk 51 and a rotary shaft 52. The rotary disk 51 is similar to a small fly wheel and is formed of one or more pieces such that the circumferential surface of the rotary disk 51 is provided with a magnetic matter 53 which has N–S poles. The magnetic matter 53 is inserted into the rotary disk 51 as a permanent magnet. The circumferential surface of the rotary disk 51 may be locally magnetized such that it has an N–S magnetic area. The size of the N–S magnetic area is dependent on the design requirement of the coding device.

The housing 60 comprises a fastening seat 61 and a cover plate 62. The fastening seat 61 is provided with a recess and is intended to fasten the fixed member 30. The cover plate 62 is provided in the center thereof with a bearing 63 for fastening pivotally the rotary shaft 52 of the movable member 50. The rotary disk 51 is located in the housing 60 such that the rotary disk 51 is capable of turning in relation to the fixed member 30, and that the magnetic matter 53 (the N–S magnetic area) and the sensors 31 are kept apart at an interval and capable of moving in relation to one another.

In operation of the coding device, the housing 60 is stationary, whereas the rotary shaft 52 is actuated by an external force to turn, thereby causing the magnetic matter 53 to move to pass in sequence the surfaces of the sensors 31. As a result, the sensors 31 detect the magnetic field of the magnetic matter 53 and thus measure a voltage value. The magnitude of the voltage value is dependent on the position of the magnetic matter 53.

Figure 7:
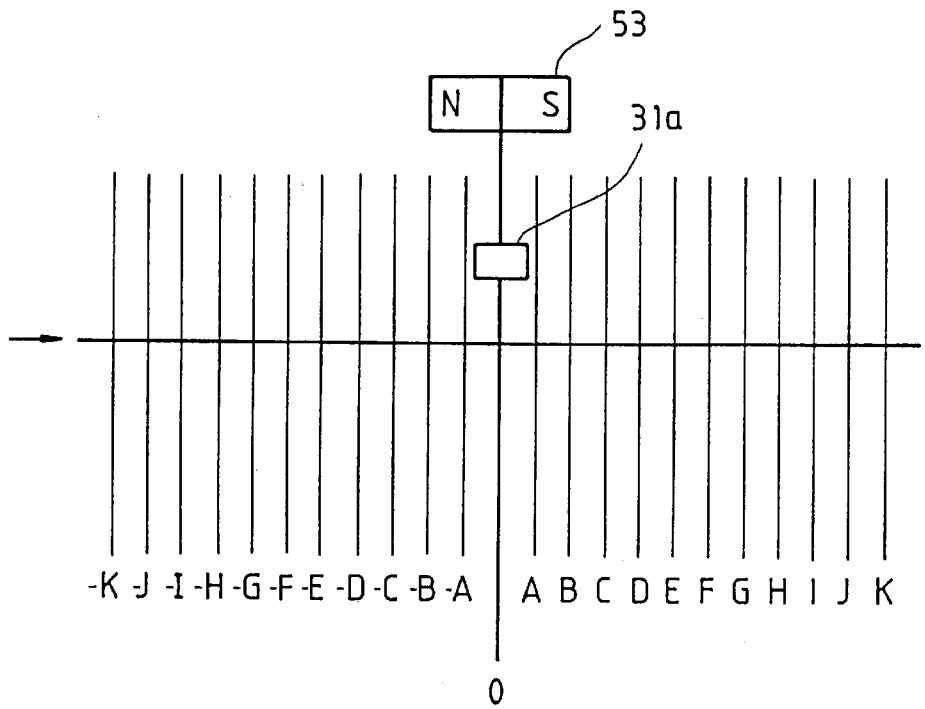
FIG. 7 shows a schematic view of the relative position state of a magnetic element of the present invention passing a Hall IC.
Figure 8:
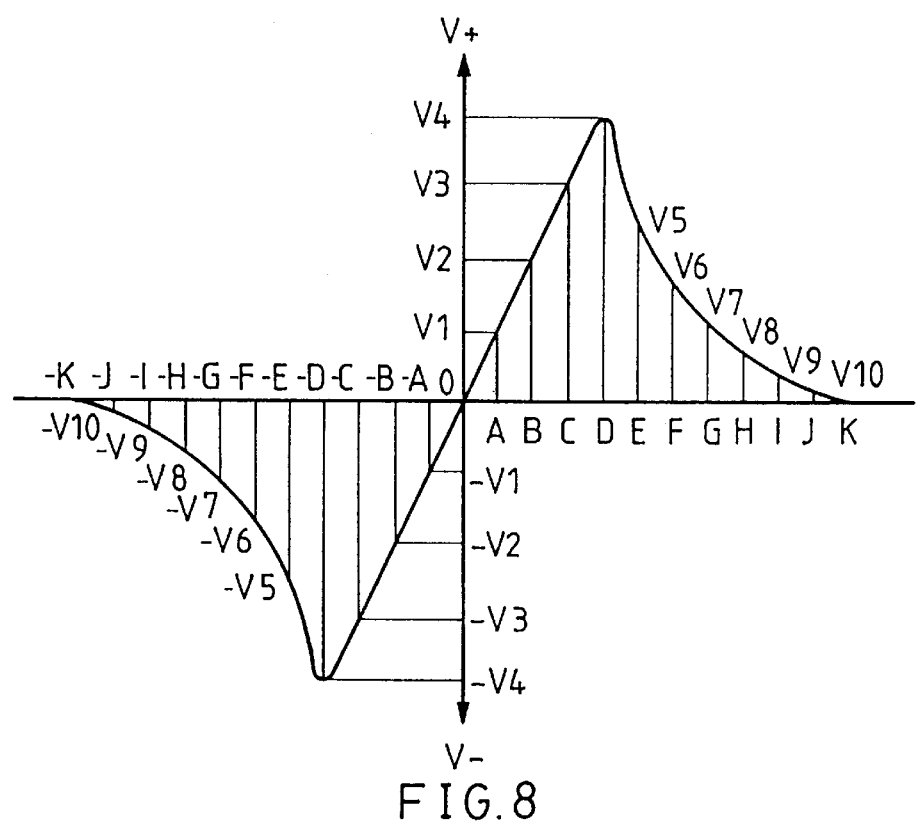
FIG. 8 shows a wave form diagram of output voltage of the induction magnetic field intensity of the Hall IC as shown in FIG. 7.

For the method and the principle of the present invention, please refer to FIGS. 7 and 8. The direction of the magnetic force of the magnetic matter 53 is from S pole to N pole. When the center of the magnetic matter 53 and the center of the Hall sensors 31 are superimposed, the N magnetic field of the magnet (magnetic matter) 53 is equal to the S magnetic field of the magnet 53. The output voltage signal of the Hall sensors 31 is 0.

When the magnet 53 is moved rightwards to reach the A point, the N magnetic field increases. In the meantime, the S magnetic field decreases. The output voltage signal of the Hall sensors 31 is +V1.

When the magnet 53 is moved rightwards to the B point, the N magnetic field increases once again. In the meantime, the S magnetic field weakens correspondingly. The output voltage signal of the Hall sensors 31 is +V2.

In the same way, when the magnet 53 is moved to the points designated as C, D, E, F, G, H, I, J, K, etc., the output voltage signals of the Hall sensors 31 are respectively V3, V4, V5, V6, V7, V8, V9, V10, V11, etc.

When the magnet 53 is moved leftwards (–A to –K) from the place where the center of the magnet is superimposed with the center of the Hall sensors 31, the output voltage signals of the points are respectively –V1 to V11.

Figure 12:
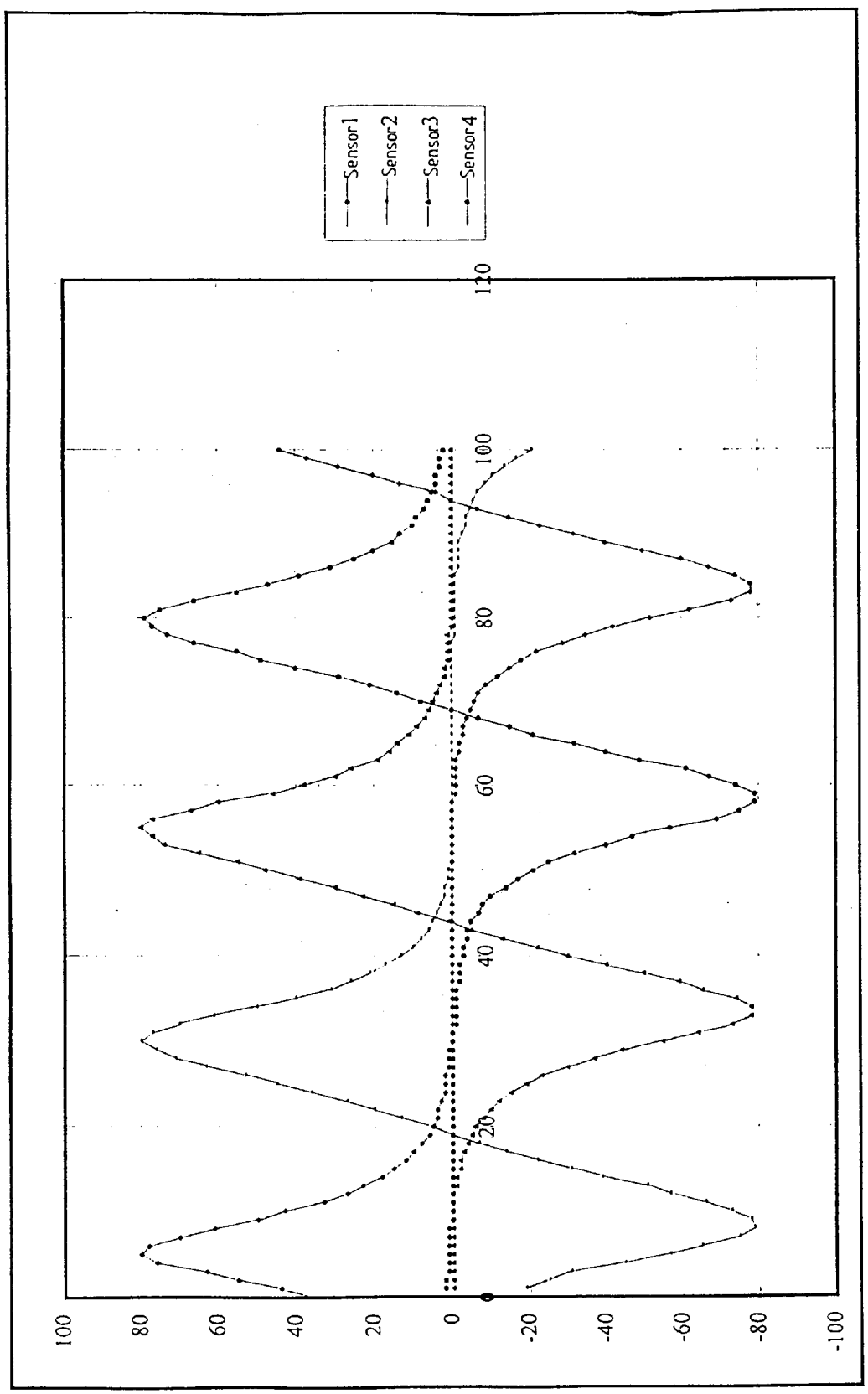
FIG. 12 shows a wave from diagram of the sensors corresponding to the data of FIG. 10.

Within the induction range, the output signals of the Hall sensors 31 are analog signals. The changes in the output voltage signals take place along with the changes in the position of the magnet 53 in the moving track of the magnet 53. Each coding device records in advance the voltage signals corresponding to various positions of the magnet 53. The voltage signals so recorded are then stored in the memory. When the coding device is in use, the position of the magnet 53 can be measured on the basis of the values of the voltage signals measured by the circuits. As shown in FIGS. 7 and 8, when the measured voltage values are the same, it is correspondingly possible that two different magnet positions may result in the error of the magnet position. For this reason, the above embodiment of the present invention makes use of four sensors 31 which are arranged circularly to detect and measure simultaneously the magnetic flux of the magnetic matter 53. Thereafter, the voltage signals generated by these sensors 31 are compared with the index table, so as to avert the error of one sensor. As a result, the precise position of the magnetic matter 53 can be determined. As shown in FIG. 11, the magnetic matter 53 turns a circle, the value is measured by each sensor 31. The data index table is based on the sampling point number being 100. The pattern formed by the corresponding value of each sensor 31 is shown in FIG. 12. The coordinate of the reference positions is thus provided.

The circuit action of the present invention is described hereinafter.

After the output signals have reached the input unit 41 from the sensors, the signals are amplified appropriately by the input unit 41 and are then sent to the ADC unit 43 by which the analog signals of the sensors 31 are converted into the digital signals, which are transmitted to the operation unit 45. The digital signals are compared with the position coordinate data of the index table stored in the memory. When identical data are found, the relative positions are retrieved and are then transmitted to the output circuit. The signal detection and the conversion action are thus completed.

In addition, the conversion of the analog signals into the digital signals involves a resolution problem. The low resolution indicates that there is a greater comparative error between the position values obtained after the conversion and the original actual values. This is indicative of a relatively low precision. The high resolution is indicative of smaller error and higher precision. For this reason, the resolution of the circuit of the present invention is dependent on the actual requirements so as to conform to the precisions of various grades. In other words, when the built-in index table is established in the system of the present invention, a higher resolution is attained under the circumstance that a greater number of the sampling points is taken within a unit length. This feature is applied to the manufacturing such that the resolution is adjusted by adjusting the number of the sampling points. As compared with the prior art coding device, the present invention has advantages in that no additional molds are needed to manufacture the signal disks of various specifications, and that no precision technology is needed, and further that the present invention is not interfered by dust and moisture, and further that the present invention is relatively cost-effective.

The coding method of the present invention is induced as follows.

The magnetic matter 53 is first moved to pass the sensors 31 which are arranged in sequence.

In accordance with the required resolution, the electronic circuit 40 is employed to record point by point the voltage data which are detected and measured by the sensors 31 at the time when the magnetic matter 53 is located at various positions. The recorded data are then used to establish an index table, which is stored in the memory as a reference position coordinate.

When the position of the magnetic matter 53 is to be detected and measured, the data of the sensors 31 are read and compared with the stored data of the index table so as to obtain the position of the magnetic matter 53. In other words, the position of the movable member 50 can be identified by the position of the magnetic matter 53 in relation to the position of each of the sensors 31.

The present invention is not confined to the detection of the rotational angle of the magnetic matter 53 in motion. When an object (the movable member is provided with the magnetic matter 53) is in the state of linear motion, the sensors 31 are arranged side by side in a row similar to that which is shown in FIG. 6. The position of the movable member can be identified by the method described above. The method of the present invention can be used to detect the position of the object which is in motion along a curved or irregular geometric moving track.

The sensing range of the sensors 31 can be expanded by increasing the number of the sensors 31 located along the moving track. In addition, the position index data stored in the memory can be renewed or corrected by the circuit in accordance with the actual requirement.

The coding method of the present invention is completely different from the coding method of the prior art in that the former makes use of the interrelationship between the magnetic matter and the Hall IC, and that the former is relatively cost-effective, and further that the former is easy to use, and still further that the former is capable of adjusting the resolution to meet various requirements without making additional signal disks. The coding device of the present invention is relatively dustproof and moisture-proof.

What is claimed is:

1. A device for identifying a magnetic induction coordinate, comprising:

a fixed member provided with a plurality of sensors arranged at an interval;

a movable member provided at an appropriate position thereof with a magnetic matter causing a portion of the movable member to have a N–S magnetic area;

the N–S magnetic area being moved to pass in sequence over the sensors of the fixed member at such time when the movable member is moved, such that the magnetic field intensities of the magnetic matter at various positions are measured by the sensors, and that data of voltage values corresponding to various positions of the magnetic matter are processed by an electronic circuit and are then stored in a memory as a reference coordinate;

the position of the movable in relation to position data of the fixed member being identified by comparing data of voltage values measured by the sensors with the voltage value data stored in the memory, under a circumstance that a relative motion relationship between the movable member and the fixed member remains in an invariable state, an identification of a position of the movable member enabling an output of a signal corresponding to position of a variable member;

wherein the voltage value data stored in the memory can be renewed and corrected by the circuit in accordance with actual requirements;

wherein four sensors are provided which simultaneously measure the magnetic flux of the magnetic matter to determine a position of the magnetic matter.

2. The device and the method as defined in claim 1, wherein the sensors of the fixed member are arranged at an appropriate interval on a moving tract of the magnetic matter of the movable member.

3. The device and the method as defined in claim 2, wherein the moving tract of the magnetic matter of the movable member cooperates with any geometric line shape of the fixed member.

4. A device for identifying magnetic induction coordinate, comprising a fixed member, an electronic circuit, a movable member, and a housing;

the fixed member being fastened with the housing such that the fixed member is stationary in relation to the housing, the fixed member being provided at an appropriate position thereof with a plurality of sensors arranged in a predetermined track, the sensors intended to detect and measure surrounding magnetic field intensities which are converted into voltage signals;

the electronic circuit consisting of an input unit, an analog-digital converter (ADC), an operation unit, and an output unit, the input unit intended to gain and amplify signals measured by the sensors, the signals being then converted from analog signals into digital signals by the analog-digital converter, the digital capable of comparing via operation unit contemporaneous output voltage data with voltage value data stored in a memory so as to identify a position coordinate of the magnetic matter, thereby resulting in an appropriate data output;

the movable member of an appropriate shape and provided on an appropriate position thereof with at least one magnetic matter capable of moving along with the movable member in a moving track which passes a predetermined track formed by arrangement of the sensors;

the electronic circuit intended to convert and process a peripheral magnetic field intensity measured by the sensors such that the peripheral field intensity is compared with the voltage value data stored in the member, so as to identify a position state of the movable member and to transmit a predetermined signal by the output unit at a predetermined position;

wherein the voltage value data stored in the memory can be renewed and corrected by the circuit in accordance with actual requirements;

wherein four sensors are provided which simultaneously measure the magnetic flux of the magnetic matter to determine a position of the magnetic matter.

5. The device as defined in claim 4, wherein the fixed member is a circuit board; and wherein the sensors are disposed on the circuit board which is fastened with a machine housing.

6. The device as defined in claim 4, wherein the magnetic matter provided in a periphery of the movable member is a permanent magnet.

7. The device as defined in claim 4, wherein each of the sensors is a Hall IC.

8. The device as defined in claim 4, wherein the movable member is composed of a rotary shaft and a rotary disk mounted on the rotary shaft, the rotary disk being a small fly wheel provided in a periphery thereof with a magnetic matter capable of turning in relation to the fixed member.

* * * * *